United States Patent [19]

Allewaert et al.

[11] Patent Number: 5,344,956
[45] Date of Patent: Sep. 6, 1994

[54] FLUOROACRYLATE MONOMERS AND POLYMERS, PROCESSES FOR PREPARING THE SAME AND THEIR USE

[75] Inventors: Kathy Allewaert, Heverlee; Dirk Coppens, Antwerpen; Francecka Fieuws, Brugge, all of Belgium

[73] Assignee: Minnesota Mining and Manufacturing Company, St. Paul, Minn.

[21] Appl. No.: 16,160

[22] Filed: Feb. 9, 1993

Related U.S. Application Data

[62] Division of Ser. No. 871,654, Apr. 21, 1992, Pat. No. 5,216,097.

[51] Int. Cl.$^5$ .................. C07C 271/10; C07C 271/24; C07C 271/28
[52] U.S. Cl. ........................ 560/26; 560/115; 560/166
[58] Field of Search ............ 560/26, 115, 166

[56] References Cited

U.S. PATENT DOCUMENTS

| | | | |
|---|---|---|---|
| 2,803,615 | 8/1957 | Ahlbrecht et al. | 260/29.6 |
| 2,995,542 | 8/1961 | Brown | 260/79.3 |
| 3,329,661 | 7/1967 | Smith et al. | 260/79.3 |
| 3,341,497 | 9/1967 | Sherman et al. | 260/72 |
| 3,398,182 | 8/1968 | Guenthner et al. | 260/455 |
| 3,578,717 | 5/1971 | Mitsch et al. | 260/607 |
| 3,838,110 | 9/1974 | Villa | 260/77.5 CR |
| 3,892,720 | 7/1975 | Jahnke | 260/79.5 C |
| 3,902,947 | 9/1975 | Grot | 156/213 |
| 3,950,298 | 4/1976 | McCown et al. | 260/33.6 F |
| 4,127,711 | 11/1978 | Lore et al. | 526/245 |
| 4,174,415 | 10/1979 | Kleiner et al. | 428/90 |
| 4,325,857 | 4/1982 | Chapnaneria et al. | 523/412 |
| 4,347,174 | 8/1982 | Nagase et al. | 523/116 |
| 4,366,300 | 12/1982 | Delesetuse | 526/245 |
| 4,465,718 | 8/1984 | Gruber | 528/49 |
| 4,482,608 | 11/1984 | Isbradt et al. | 428/421 |
| 4,584,143 | 4/1986 | Falk | 558/240 |
| 4,612,356 | 9/1986 | Falk | 526/243 |
| 4,778,915 | 10/1988 | Lina et al. | 560/29 |
| 4,920,190 | 4/1990 | Lina et al. | 526/288 |
| 5,144,056 | 9/1992 | Lina et al. | 560/25 |
| 5,216,097 | 6/1993 | Allewaert et al. | 526/243 |

FOREIGN PATENT DOCUMENTS

| | | |
|---|---|---|
| 216493 | 7/1957 | Austria. |
| A1414155 | 2/1991 | European Pat. Off.. |
| 3106915 | 5/1991 | Japan. |
| A1011976 | 12/1965 | United Kingdom. |

*Primary Examiner*—José G. Dees
*Assistant Examiner*—Barbara S. Frazier
*Attorney, Agent, or Firm*—Gary L. Griswold; Walter N. Kirn; Carole Truesdale

[57] ABSTRACT

The invention provides polymers or copolymers which are prepared by the polymerization of the reaction product of a diisocyanate with a perfluoro compound or an epichlorhydrinadduct thereof and (meth)acrylic esters of a three hydroxyl groups containing compound. Furthermore, the invention relates to fluoroacrylic monomers, a process for preparing the polymers or copolymers and a treatment agent comprising the polymers or copolymers of the invention and an environmentally acceptable solvent. Polymers and copolymers of the invention can be used for making textiles, papers, non-woven articles, leather, plastic, wood, metal, stone and cement water and oil repellent.

6 Claims, No Drawings

FLUOROACRYLATE MONOMERS AND POLYMERS, PROCESSES FOR PREPARING THE SAME AND THEIR USE

This is a division of application Ser. No. 07/871,654, filed Apr. 21, 1992, now U.S. Pat. No. 5,216,097.

The present invention relates to polymers or copolymers obtainable by the polymerization of the reaction products of diisocyanates with a perfluoro compound or an epichlorhydrin adduct thereof and methacrylic esters of a compound containing three hydroxyl groups. Furthermore, the invention relates to a fluoroacrylic monomer as an intermediate product and to a process for preparing the polymers or copolymers and its use providing water and oil repellency to textiles, papers, non-woven articles, leather, plastic, wood, metal, glass, stone and cement.

Furthermore, the invention relates to a treatment agent which comprises the polymers or copolymers according to the invention and an environmentally acceptable solvent.

During the past years there is a growing market demand for fluorochemical products with good oil and water repellency for the treatment of various substrates.

The use of fluoroacrylic polymers for products with good oil and water repellency for treatment of substrates is described in U.S. Pat. No. 4,778,915. this reference described fluoroacrylic monomers and polymers which are prepared from a diisocyanate, a polyfluoro compound and an acrylic or methacrylic ester of a 2-alkylaminoethanol, preferably 2-t-butylaminoethylmethacrylate. These fluoroacrylic polymers can be used for the treatment of textiles or leather.

German Patent Publication No. A-31 19 058 describes a treatment agent for textile filaments consisting of a aqueous dispersion of a perfluoroalkyl ester of a citric acid urethane and a fluorinated alcohol and the reaction product of an epoxy resin, a polymer with a carboxyl function and a aqueous solution of a tertiary amine.

U.S. Pat. No. 4,612,356 describes homo- and co-addition polymers of di-perfluoroalkyl carbamyl group-containing (meth)acrylate monomers and their use as oil and water repellency treatment of textiles.

European Patent Publication No. 0 100 277 describes a coating for infrared transparency films consisting of a copolymer formed from one fluorocarbon monomer prepared from equiomolar amounts of N-ethylperfluorooctyl-sulfonamidoethanol, 2,4-toluene diisocyanate and hydroxypropylmethacrylate.

U.S. Pat. No. 4,920,190 discloses fluorinated acrylic monomers prepared by reacting in a first stage toluene 2,4-diisocyanate with an equimolar amount of a polyfluorinated compound to form a fluorinated urethaneisocyanate and then reacting this urethane-isocyanate with an equimolar amount of an acrylic ester.

The polymers and copolymers which are used for the preparation of treatment agents for making substrates oil and water repellent have the disadvantage that they are only soluble in environmentally unacceptable solvents such as 1,1,1-trichloroethane and trichlorotrifluoroethane in which they show a good performance. During the past years, there is a growing market demand for fluorochemical products which are soluble in environmentally acceptable solvents such as isopropanol. U.S. Pat. No. 4,778,915 describes a fluoroacrylic polymer which is soluble in isopropanol and from which aqueous dispersions can be prepared. The disadvantage of the treatment agents described in this reference is that the substances only show a very low performance in comparison to the treatment agents which are dissolved in environmentally unacceptable solvents.

The present invention provides polymers or copolymers comprising the polymerization product of (a) diisocyanate with a perfluoro compound or an epichlorhydrin adduct thereof, said perfluoro compound having a terminal hydroxyl, thiol, primary or secondary amino group attached to the perfluoroalkyl group directly via an alkylene bridge or indirectly via an alkylene bridge and a sulphonamido, carbonamide, ether, thioether, sulphonyl or carboxylic ester group between the perfluoroalkyl and the alkylene group, and (b) (meth)acrylic esters of a three hydroxyl groups containing compound.

The fluoroacrylate polymers of the present invention can be used as treatment agents for making substrates oil and water repellent and are easily soluble in environmental acceptable solvents like isopropanol and water and provide good oil and water repellency.

In a preferred embodiment the (meth)acrylic esters are the reaction products of an equimolar reaction between (meth)acrylic acid and a three hydroxyl group containing compound.

The reaction product which is used for the preparation of the polymers or copolymers according to the invention can be represented by the following general formula:

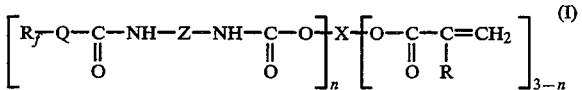

The fluoroaliphatic group is designated herein as $R_f$. $R_f$ is a stable, inert, nonpolar, preferably saturated monovalent moiety which is both oleophobic and hydrophobic. A fluorinated oligomer preferably comprises from 2 to about 25 $R_f$ groups and preferably comprises about 5 percent to about 30 percent, and more preferably about 8 percent to about 20 percent fluorine by weight based on the total weight of the oligomer, the loci of the fluorine being essentially in the $R_f$ groups. $R_f$ preferably contains at least about 3 carbon atoms, more preferably 3 to about 20 carbon atoms, and most preferably about 6 to about 12 carbon atoms. $R_f$ can contain straight chain, branched chain, or cyclic alkyl groups. $R_f$ is preferably free of polymerizable olefinic unsaturation and can optionally contain catenary heteroatoms such as oxygen, divalent or hexavalent sulfur, or nitrogen. It is preferred that each $R_f$ contain about 40% to about 78% fluorine by weight, more preferably about 50% to about 78% fluorine by weight. The terminal portion of the $R_f$ group contains a fully fluorinated terminal group. This terminal group preferably contains at least 7 fluorine atoms, e.g., $CF_3CF_2CF_2$, $(CF_3)_2CF$, $CF_2SF_5$, or the like. Perfluorinated aliphatic groups, i.e., those of the formula $C_nF_{2n+1}$, are the most preferred embodiments of $R_f$.

Linking group Q can be a covalent bond, a heteroatom, such as O or S, or an organic moiety. The linking group Q is preferably an organic moiety containing 1 to about 20 carbon atoms, and optionally containing oxygen, nitrogen-, or sulfur-containing groups or a combination thereof, and preferably free of active hydrogen atoms. Examples of structures suitable for linking group Q include straight chain, branched chain, or cyclic alkylene, arylene, aralkylene, oxy, oxo, thio, sulfonyl, sulfinyl, imino, sulfonamido, carbonamido, carbonyloxy, urethanylene, ureylene, and combinations thereof such as sulfonamidoalkylene. Preferred linking groups Q can be selected according to ease of preparation and commercial availability. Below is a partially representative list of suitable organic Q groups. For the purposes of this list, each k is independently an integer from 1 to about 20, g is an integer from 0 to about 10, h is an integer from 1 to about 20, R' is hydrogen, phenyl, or alkyl of 1 to about 4 carbon atoms, and R" is alkyl of 1 to about 20 carbon atoms.

—$SO_2NR'(CH_2)_kO(O)C$—
—$CONR'(CH_2)_kO(O)C$—
—$(CH_2)_kO(O)C$—
—$CH_2CH(OH)CH_2O(O)C$—
—$CH_2CH(OR'')CH_2O(O)C$—
—$(CH_2)_kC(O)O$—
—$(CH_2)_kSC(O)$—
—$(CH_2)_kO(CH_2)_kO(O)C$—
—$(CH_2)_kS(CH_2)_kO(O)C$—
—$(CH_2)_k(OCH_2CH_2)_kO(O)C$—
—$(CH_2)_kSO_2(CH_2)_kO(O)C$—
—$SO_2NR(CH_2)_kO(CH_2CH_2)_kO(O)C$—
—$(CH_2)_kSO_2NR(CH_2)_kO(O)C$—
—$(CH_2)_kSO_2$—
—$SO_2NR'(CH_2)_k$—
—$OC_6H_4CH_2O(O)C$—

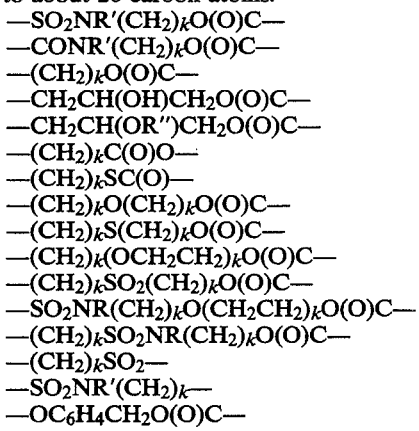

For linking $R_f$, Q is preferably alkylene or sulfonamido, or sulfonamidoalkylene.

R is a hydrogen or a methyl group, Z is a divalent aliphatic, alicyclic or aromatic connecting group.

The divalent organic linking group Z connects successive isocyanate moieties. Illustrative linking groups Z are alkylene groups, such as ethylene, isobutylene, hexylene, and methylenedicyclohexylene, having 2 to about 20 carbon atoms, aralkylene groups, such as —$CH_2C_6H_4CH_2$— and —$C_6H_4CH_2C_6H_4$—, having up to 20 carbon atoms, arylene groups, such as tolylene, —$C_6H_3(CH_3)$—, poly(oxyalkylene) groups, such as —$(C_2H_4O)_yC_2H_4$— where y is 1 to about 5, and various combinations of these groups. Such groups can also include other hetero moieties (besides —O—), including —S— and —N—. However, Z is preferably free of groups with active hydrogen atoms.

X is a trivalent connecting group. X can be aliphatic, aromatic or cycloaliphatic. X is preferably an aliphatic group containing at least 3 carbon atoms and which may be straight chain or branched. Particularly preferred are residues of alkanetriols and nitriloalkanols. Examples of such groups include, for example, the residues of trimethanolethane, triethanolamine, 1,3,5-trihydroxybenzene and 1,3,5-tris(S-hydroxyethyl) cyanuric acid.

n is 1 or 2, preferably 2.

The fluorinated (meth)acrylic monomers of the formula (I) according to the invention may be prepared by reacting a diisocyanate of formula $$O=C=N-Z-N=C=O \qquad (II)$$

wherein Z is defined as above with preferably equimolar quantities of a polyfluoro compound of the formula $$R_f-Q-H \qquad (III)$$

wherein $R_f$ and Q are defined as above and a (meth)acrylic ester of the formula

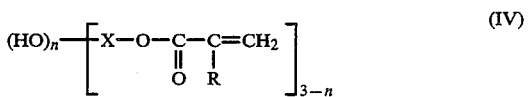

wherein n is 1 or 2, preferably 2 and R and X are as defined as above.

Examples of diisocyanates which may be used include aromatic diisocyanates such as 2,4 and/or 2,6 toluene diisocyanate (TDI), 4,4'-diphenylmethane diisocyanate (MDI), and (MTMXDI)-metatetramethylxylene diisocyanate. Furthermore, aliphatic diisocyanates such as hexamethylene diisocyanate (HMDI), trimethylhexamethylenediisocyanate (TMHMDI), decamethylene diisocyanate and Dimer Diisocyanate (DDI 1410 from Henkel) and alicyclic diisocyanates such as 4,4'-methylene bis (cyclohexyl isocyanate), trans 1,4-cyclohexyldiisocyanate (CHDI), isophorondiisocyanate (IPDI) can be used. Among these diisocyanates, 2,4-toluene diisocyanate (TDI) is especially preferred by itself or mixed with the 2,6 isomer.

As the compound of formula (III), a perfluoro compound or an epichlorhydrin adduct thereof is used, the compound having a terminal hydroxyl, thiol, primary or secondary amino group attached to the perfluoroalkyl group directly via alkylene bridge or indirectly via an alkylene bridge and a sulphonamido, carbonamide, ether, thioether, sulphonyl or carboxylic ester group between the perfluoroalkyl and the alkylene group and (meth)acrylic esters of a three hydroxyl groups-containing compound.

Examples of such polyfluoro compounds include, but are not limited to, those of the following formulas:

$$R_f-(CH_2)_p-OH \qquad (III\text{-}a)$$

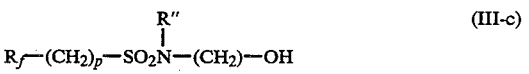

$$R_f-(CH_2)_p-O-(CH_2)_q-OH \qquad (III\text{-}d)$$

$$R_f-(CH_2)_p-S-(CH_2)_q-OH \qquad (III\text{-}e)$$

 (III-f)

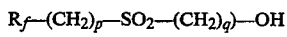 (III-g)

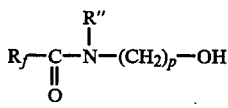 (III-h)

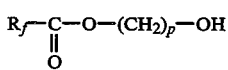 (III-i)

$R_f$—CH=CH—$(CH_2)_p$—OH (III-j)

$R_f$—$(CH_2)_p$—SH (III-k)

$R_f$—$(CH_2)_p$—$NH_2$ (III-l)

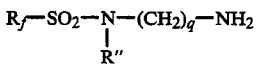 (III-m)

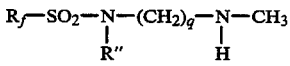 (III-n)

in which $R_f$ has the same meaning as defined above and R" is hydrogen or an alkyl group and the symbols p and q which can be identical or different each denote an integer ranging from 1 to 20 and preferably equal to 2 or 4. Among these compounds (III), those with a hydroxyl functionality are preferred. Particularly preferred are the N-alkyl(perfluorooctane)sulphonamidoalkyl alcohols or telomer alcohols listed in Table 1 as fluorochemical alcohols.

As examples of esters of the formula (IV) which may be employed for the formation of the polymer according to the invention, acrylic and methacrylic esters of the three hydroxyl group containing compound can be used. Preferred are alkanetriols or nitrilotrialkanols. Particularly preferred are the three hydroxyl group containing compounds listed in Table 1 ($b_1$–$b_5$). The products referring to formula (IV) can be prepared by known techniques. Thus, equimolar amounts of alkanetriol can be reacted with acrylic or methacrylic acid or alternatively acryloylchloride or methacryloylchloride can be reacted with alkanetriol. Preferably, the (meth)acrylic ester mixture of the alkanetriol is prepared by reacting 0.8 to 1.5 mol acrylic acid per mol of alkanetriol.

The synthesis of the fluorinated (meth)acrylate monomer (I) according to the invention is preferably conducted in an organic solvent such as ketone, ester, aromatic solvents, alkane, halogenated hydrocarbons, dimethylformamide, N-methylpyrrolidone or acetonitrile. Especially preferred are methylethylketone, methylisobutylketone, ethylacetate, butylacetate, toluene, xylene, benzene, hexane, heptane, cyclohexane, tetrahydrofuran, diethylether, diethylene glycol dimethylether, 1,1,1-trichloroethane, trichlorotrifluoroethane.

The addition reactions of the polyfluoro compound $R_f$—Q—H (III) and of the (meth)acrylic esters (IV) to the isocyanate groups are carried out between 30° C. and 90° C. under an inert atmosphere and in the absence of water. Since the reaction is very slow, it is preferred to conduct the reaction in the presence of a catalyst such as, for example, a tertiary amine, a tin salt and/or a lead salt. Preferably used are triethylamine, triethylenediamine, N-methylmorpholine, dibutyltindilaurate, tin octanoate, lead naphthonate. The amount of catalyst is usually from 0.05 to 1% based on the total weight of the reactants.

In order to limit the formation of symmetrical diaddition products, in a preferred embodiment the perfluoro compound $R_f$—Q—H (III) is added to the isocyanate compound and reacted under inert atmosphere without a catalyst. The (meth)acrylic ester is added in a second step and reacts very readily with the remaining free isocyanate groups when using a combination of a tertiary amine and a tin like catalyst.

The invention further relates to the polymers containing repeating units of the formula (I) in which the various symbols have the same meanings as defined before. The polymers may be prepared from the monomers of formula (I) by homopolymerization or by copolymerization with other monomers.

Examples of hydrocarbon and fluorinated comonomers which may be used in the present invention include moieties derived from vinylethers, vinylester, alylesters, vinylketones, styrene, vinylamide, acrylamide, maleates, fumarates, acrylates and (meth)acrylates. Preferably used are comonomers from acrylates and methacrylates. As examples of hydrocarbon comonomers which may be used within the scope of the present invention the following are included:

lower (halogenated or otherwise) olefinic hydrocarbons such as ethylene, propylene, isobutene, 3-chloro-1-isobutene, butadiene, isoprene, chloro- and dichlorobutadiene, fluoro- and difluorobutadienes, 2,5-dimethyl-1,5-hexadiene and diisobutylene;

vinyl, allyl or vinylidene halides such as vinyl or vinylidene chloride, vinyl or vinylidene fluoride, allyl bromide and methallyl chloride;

styrene and its derivatives, such as vinyltoluene, α-methylstyrene, α-cyanomethylstyrene, divinyl benzene, and N-vinylcarbazole;

vinyl esters such as vinyl acetate, vinyl propionate, vinyl esters of acids known commercially under the name of "Versatic Acids", vinyl isobutyrate, vinyl senecioate, vinyl succinate, vinyl isodecanoate, vinyl stearate and divinyl carbonate;

allyl esters such as allyl acetate and allyl heptanoate;

alkyl vinyl ethers or alkyl allyl ethers (halogenated or otherwise), such as cetyl vinyl ether, dodecyl vinyl ether, isobutyl vinyl ether, ethyl vinyl ether, 2-chloroethyl vinyl ether and tetraallyl oxy ethane;

vinyl alkyl ketones such as vinyl methyl ketone; unsaturated acids such as acrylic, methacrylic, α-chloroacrylic, crotonic, maleic, fumaric, itaconic, citraconic and senecioic acids, their anhydrides and their esters such as vinyl, allyl methyl, butyl, isobutyl, hexyl, heptyl, 2-ethylhexyl, cyclohexyl, lauryl, stearyl or alkoxy ethyl acrylates and methacrylates, dimethyl maleate, ethyl crotonate, methyl hydrogen maleate, butyl hydrogen itaconate, glycol or polyalkylene glycol diacrylates and dimethacrylates such as ethylene glycol dimethacrylate or triethylene glycol dimethacrylate, dichlorophosphatoalkyl acrylates and methacrylates such as dichlorophosphatoethyl methacrylate, and bis(methacryloyloxyethyl) hydrogen phosphate and methacryloyloxy propyltrimethoxysilane;

acrylonitrile, methacrylonitrile, 2-chloroacrylonitrile, 2-cyanoethyl acrylate, methylene glutaronitrile, vinylidene cyanide, alkyl cyanoacrylates such as isopropyl cyanoacrylate, tris(acryloyl)hexahydro-s-triazine, vinyltrichlorosilane, vinyltrimethoxysilane, vinyltriethoxysilane and N-vinyl-2-pyrrolidone;

allyl alcohol, allyl glycolate, isobutenediol, allyloxyethanol, o-allylphenol, divinylcarbinol, glycerol allyl ether, acrylamide, methacrylamide, maleamide and maleimide, N-(cyanoethyl)acrylamide, N-isopropyl acrylamide, diacetoneacrylamide, N-(hydroxymethyl) acrylamide and methacrylamide, N-(alkoxymethyl)-acrylamides and methacrylamides, glyoxal bisacrylamide, sodium acrylate or methacrylate, vinylsulphonic and styrene-p-sulphonic acids and their alkali metal salts, 3-amino-crotononitrile, monoallylamine, vinylpyridines, glycidyl acrylate or methacrylate, allyl glycidyl ether, acrolein, N,N-dimethylaminoethyl methacrylate or N-tertbutylamino ethyl methacrylate are used.

Fluorinated comonomers and methods for the preparation thereof are known and disclosed, for example, in U.S. Pat. No. 2,803,615 (Ahlbrecht et al.) which disclosure is incorporated herein by reference. Examples of such compounds include general classes of fluorochemical olefins such as acrylates, methacrylates, vinyl ethers, and allyl compounds containing fluorinated sulfonamido groups, acrylates or methacrylates derived from fluorochemical telomer alcohols, fluorochemical thiols and the like.

Preferred compounds include, for example, N-methyl perfluorooctanesulfonamidoethyl acrylate, N-methyl perfluorooctanesulfonamidoethyl methacrylate, N-ethyl perfluorooctanesulfonamidoethyl acrylate, the reaction product of isocyanatoethyl methacrylate and N-methylperfluorooctanesulfonamidoethyl alcohol, perfluorooctyl acrylate, N-methyl perfluorooctanesulfonamidoethyl vinyl ether, and N-allyl perfluorooctanesulfonamide, and others such as perfluorocyclohexyl acrylate, and tetrameric hexafluoropropyleneoxide dihydroacrylate.

The fluoro copolymers according to the invention may be prepared in a per se known manner by polymerization in an organic solvent or in an aqueous emulsion. Since the water and oil repellent agent according to the invention is usually used in solution, the solution polymerization is preferred. The process is usually carried out between 50° C. and 110° C. The total monomer concentration may vary from 5 to 60% by weight. The polymerization in a solvent medium may be performed in the same solvents which are used for the synthesis of the fluorochemical diurethaneacrylic monomer (I).

The polymerization is carried out in the presence of initiators used in an amount of 0.1 to 1.5% based on the total weight of the monomers employed. It is possible to use peroxides such as benzoylperoxide, lauroylperoxide, succinylperoxide, and tert-butyl perpivalate, or azo compounds such as for example, 2,2'-azobisisobutyronitrile, 4,4'-azobis (4-cyanopentanoic acid) and azodicarbonamide. If required, the length of the polymer chains may be regulated by means of chain transfer agents such as alkylmercaptan, carbon tetrachloride or triphenylmethane, used in a proportion of 0.05 to 1% based on the total weight of the monomers.

The polymerization in aqueous emulsion may be carried out according to well known methods. Various surfactants such as anionic, cationic, nonionic or amphoteric surfactants may be employed as the dispersant. These surfactants may be used alone or in combination.

To more easily emulsify the monomer it is generally advantageous to use organic solvents such as, for example, ketones, glycols or ethylene glycol ethers, alcohols or mixtures of this solvents. In general, the quantity of solvent should not exceed the total weight of the monomer.

Water soluble products such as inorganic peroxides and persalts or water insoluble initiators such as organic peroxides and the azo compounds referred to before may also be used as polymerization initiator in an aqueous emulsion.

The polymers or copolymers of the invention can be used as treatment agents in a solution of an environmentally acceptable solvent. Preferred solvents are alkanoles, ketones, esters or mixtures thereof. Especially preferred is isopropanol.

Also polymer emulsions can be prepared by diluting the polymer according to the invention with water.

The polymers or copolymers of the invention and the treatment agents can be used for providing water and oil repellency to textiles, papers, non-woven articles, leather, plastics, wood, metals, glass, stone and cement.

There is no particular restriction on the methods used to apply the polymers or copolymers of the invention to the substrates. The application of the diluted products may be carried out by spraying, dipping or padding followed by drying at ambient temperature or a temperature which may range up to 150° C. The quantity of polymer to be employed may vary within wide limits, depending on the nature of the substrate and the fluorine content of the polymer.

In the following examples and comparative examples the water repellency (WR), the oil repellency (OR) and the spray rating (SR) were measured using the following tests.

Water Repellency Test

The aqueous stain or water repellency of treated sample is measured using a water/isopropyl alcohol test, and is expressed in terms of a water repellency rating of the treated fabric. Treated fabrics which are penetrated by or resistant to a 100 percent water/ zero percent isopropyl alcohol mixture (the least penetrating of the test mixtures) are given a rating of 100/0, whereas treated fabrics resistant to a zero percent water/100 percent isopropyl alcohol mixture (the most penetrating of the test mixtures) are given a rating of 0/100. Other intermediate values are determined by use of other water/isopropyl alcohol mixtures, in which the percentage amounts of water and isopropyl alcohol are each multiples of 10. Results are reported as an average of replicant testing. The water repellency rating corresponds to the most penetrating mixture which does not penetrate or wet the fabric after 30 seconds contact. In general, a water repellency rating of 90/10 or better, e.g., 80/20, is desirable for fabric.

Oil Repellency Test

The oil repellency of treated carpet and textile sample is measured by the American Association of Textile Chemists and Colorists (AATCC) Standard Test Method No. 118–1983, which test is based on the resistance of treated fabric to penetration by oils of varying surface tensions. Treated fabrics resistant only to "Nujol", a brand of mineral oil and the least penetrating of the test oils, are given a rating of 1, whereas treated fabrics resistant to heptane (the most penetrating of the test oils) are given a value of 8. Other intermediate values are determined by use of other pure oils or mixtures of oils, as shown in the following table:

| Standard Test Liquids | | |
|---|---|---|
| AATCC OIL Repellency Rating Number | | Composition |
| 1 | | "Nujol" |
| 2 | | 65:35 "Nujol": n-hexadecane by volume @ 70° F. (21° C.) |
| 3 | | n-hexadecane |
| 4 | | n-tetradecane |
| 6 | | n-decane |
| 7 | | n-octane |
| 8 | | n-heptane |

The rated oil repellency corresponds to the most penetrating oil (or mixture of oils) which does not penetrate or wet the fabric 30 seconds contact. Higher numbers indicate better oil repellency. In general, an oil repellency of 2 or greater is desirable for fabric.

Spray Rating Test

The resistance of a treated substrates to wetting with water was measured using a "Water Repellency Spray Test as described in American Association of Textile Chemists and Colorists Technical Manual, 1977, 53, 245. Samples are rated on a scale of 0 to 100 with 0 indicating complete wetting of the upper and lower surfaces of the substrate and with a 100 indicating no wetting.

EXAMPLES

The following non-limiting examples show embodiments of the invention. The reactants used in the examples are listed in table 1.

TABLE 1

| Code | Reactant Formulas | |
|---|---|---|
| | Polymerizable monomer | |
| $A_1$ | $CH_2=CH-COOH$ | Acrylic Acid |
| $A_2$ | $CH_2=C(CH_3)-COOH$ | Methacrylic Acid |
| | Polyols | |
| $B_1$ | $CH_3C(CH_2OH)_3$ | |
| $B_2$ | $CH_3CH_2C(CH_2OH)_3$ | |
| $B_3$ | $N(CH_2CH_2OH)_3$ | |
| $B_4$ | $HOCH_2CH(OH)CH_2OH$ | |
| $B_5$ | $HOCH_2CH(OH)CH_2(CH_2)_3OH$ | |
| | Isocyanates | |
| TDI | 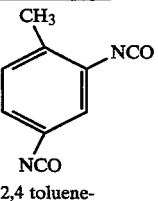 2,4 toluene-diisocyanate | |
| MDI | 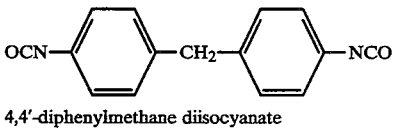 4,4'-diphenylmethane diisocyanate | |
| Desmodur W | 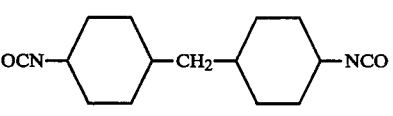 4,4' methylene bis (cyclohexyl isocyanate) | |
| DDI 1410 | Dimer Diisocyanate MW = 600 (Henkel) | |
| | Fluorochemical alcohols | |

TABLE 1-continued

| Code | Reactant Formulas |
|---|---|
| $C_1$ | $C_8F_{17}SO_2N(Et)CH_2CH_2OH$ |
| $C_2$ | $C_8F_{17}SO_2N(Me)CH_2CH_2OCH_2CH(CH_2Cl)OH$ |
| $C_3$ | $C_8F_{17}SO_2N(Bu)CH_2CH_2OH$ |
| $C_4$ | $C_8F_{17}SO_2N(Me)(CH_2)_{11}OH$ |
| $C_5$ | $C_8F_{17}SO_2N(Me)CH_2CH_2OH$ |
| $C_6$ | $C_nF_{2n+1}CH_2CH_2O$ (n is about 8) |
| $C_7$ | $C_nF_{2n+1}CH_2CH_2O(CH_2CHO)_nH$<br>$\quad\quad\quad\quad\quad\quad\quad\quad\quad\quad\mid$<br>$\quad\quad\quad\quad\quad\quad\quad\quad\quad\quad CH_2Cl$ |

PREPARATION OF THE INTERMEDIATE
(EXAMPLE 1)

To a 2 liter 3-necked flask equipped with a heating mantle, stirrer, thermometer, dean-stark and reflux-cooler were charged the following:

| 1,2,6-trihydroxyhexane | 268.3 g |
|---|---|
| Methacrylic Acid | 172.18 g |
| AMBERLYST 15 dry | 13.2 g |
| Heptane | 189 g |
| MEHQ | 0.66 g |
| phenothiazine | 0.66 g |

The mixture was heated to reflux temperature and stirred for about 5 hours. Analysis by gas chromatography showed that the reaction had ended. A mixture containing mainly the monomethacrylate component and smaller amounts dimethacrylate and unreacted triol was obtained. Thereafter, the heptane was evaporated off and a viscous clear product was obtained. After dilution to 50% solids in isobutylmethylketone, the AMBERLYST beads were filtrated off. The product was stored until needed for further reaction.

EXAMPLE 2

91.5 g dry isobutylmethylketone and 26.6 g (0.1 mol) Desmodur W (Bayer, 4,4'-methylene bis(cyclohexylisocyanate)), 64.9 g (0.1 mol) N-methyl (perfluorooctane) sulphonamidoethyl epi(I)alcohol ($C_8F_{17}SO_2N$-(Me)$C_2H_4OCH_2$-$CH(CH_2Cl)OH$), and 3 drops of dibutyltindilaurate were charged into a 500 mL 3-necked flask equipped with a heating mantle, stirrer, thermometer, a reflux condenser and nitrogen inlet. Air was purged from the reaction flask with a stream of dry nitrogen, and then the temperature of the reaction mixture was raised to 80° C. and stirred for about 1 hour (analysis by infrared absorption indicated that the reaction had ended). Thereafter, the reaction mixture was cooled to about 50° C. and 20.2 g (0.05 mol, 50% solids content) of the methacrylate solution prepared in Ex. 1, was added. The reaction mixture was again raised to 80° C. for about 5 hours and was then cooled. Infrared absorption analysis of a small portion of reaction mixture indicated that all of the isocyanate groups had been converted to urethane groups. 203.5 g of a yellow solution of a monomer according to the invention was obtained in this manner. This solution contained 50% solids.

EXAMPLES 3–9

Following the general procedures of Examples 1 and 2, and using reactants shown in Tables 1 and 2, additional fluorochemical (meth)acrylate monomers according to the invention were prepared.

TABLE 2

| Ex. No. | Fluorochem. | Isocyanate | Polyol | Polym. monomer |
|---|---|---|---|---|
| 2 | $C_2$ | Desmodur W | $B_5$ | $A_2$ |
| 3 | $C_1$ | TDI | $B_2$ | $A_1$ |
| 4 | $C_3$ | MDI | $B_1$ | $A_2$ |
| 5 | $C_6$ | TDI | $B_2$ | $A_1$ |
| 6 | $C_1$ | MDI | $B_4$ | $A_2$ |
| 7 | $C_7$ | TDI | $B_2$ | $A_2$ |
| 8 | $C_5$ | DDI | $B_3$ | $A_2$ |
| 9 | $C_4$ | TDI | $B_2$ | $A_1$ |

The general mixtures corresponding to the acrylate monomer mixtures are shown in Table 2A.

TABLE 2A a  $X(O-\underset{\underset{O}{\|}}{C}-NH-Z-NH-\underset{\underset{O}{\|}}{C}-Q-R_f)_3$ b  $X(O-\underset{\underset{O}{\|}}{C}-NH-Z-NH-\underset{\underset{O}{\|}}{C}-Q-R_f)_2$ $\underset{\underset{O\ R}{\ }}{O-\underset{\|}{C}-\underset{\|}{C}=CH_2}$ c  $X(O-\underset{\underset{O}{\|}}{C}-\underset{\underset{R}{\|}}{C}=CH_2)_2$
   $\underset{\underset{O}{\|}}{|}$
   $OCNH-Z-NH-\underset{\underset{O}{\|}}{C}-Q-R_f$

EXAMPLE 10

Into a dry 500 ml three necked flask fitted with stirrer, addition funnel, a condenser, a thermometer, and nitrogen inlet and outlet, were placed 150 g (0.037 mol, 50% solids) of the monomer solution of Ex. 2, followed by 100 g isobutylmethylketone and 0.75 g n-octylmercaptan (1% on solids). After purging the reactor with nitrogen, the temperature of the reaction mixture was raised to about 65° C. and 0.75 g (0.5% on solids weight) of 2,2'-azobisisobutyronitrile (AIBN) was added. The reaction mixture was refluxed at about 65° C. for 16 hours. The reaction was substantially complete as indicated by gaschromatography. After cooling a yellow solution of homopolymer according to the invention was obtained. The solution contained 30% polymer solids.

EXAMPLE 11

Into a reactor flask as described in Example 10 are added 105 g of the monomer solution, Ex. 2, 22.5 g ethylacrylate and 122.5 g isobutylmethylketone and 0.75 g n-octylmercapton. After purging the reactor with nitrogen, the temperature of the reaction mixture was raised to 65° C. and 0.75 g AIBN was added. The polymerization was complete after 16 hours. The resulting yellow solution was filtered and contained 30% solids.

EXAMPLE 12–25

In these examples, homopolymers and copolymers according to this invention, specified in Table 3, were prepared and diluted to 0.5% solids in isobutylmethylketone or isopropanol (see Table 3). These dilutions were sprayed using "hand spray" equipment onto textile substrates (0.5% solids on fabric (SOF)) and grain leather (0.018 g/m², 0.2 g/sqft) and were left to dry for 24 hours at ambient temperature before the following tests were carried out: oil repellency (OR), water repellency (WR) and resistance to waterspray (SR). The test results are set forth in Table 3.

TABLE 3

| Ex No. | Fluoromonomer Table 1 No. | Comonomer | Solvent | PES/Cotton OR | WR | SR | Leather grain OR | WR | SR |
|---|---|---|---|---|---|---|---|---|---|
| 10 | 2 |  | IPA | 2 | 3 | 70 | 7 | 7 | 90 |
| 11 | 2 | EA | IPA | 3+ | 4 | 80 | 4 | 6 | 80 |
| 12 | 3 |  | MIBK | 3 | 5 | 70 | 2 | 4 | 70 |
| 13 | 3 | isoBMA | IPA | 6 | 6 | 75 | 5 | 7 | 90 |
| 14 | 4 |  | MIBK | 4 | 4 | 80 | 6 | 2 | 75 |
| 15 | 4 | LA | MIBK | 4 | 4 | 80 | 3 | 8 | 75 |
| 16 | 5 |  | MIBK | 5 | 6 | 80 | 7 | 3 | 85 |
| 17 | 5 | BenzMa | MIBK | 4 | 6 | 75 | 2 | 5 | 90 |
| 18 | 6 |  | MIBK | 3 | 7 | 75 | 5 | 4 | 75 |
| 19 | 6 | glycidlMA | MIBK | 1 | 3 | 70 | 3 | 4 | 70 |
| 20 | 7 |  | MIBK | 5 | 5 | 75 | 7 | 5 | 90 |
| 21 | 7 | AAEMA | MIBK | 4 | 4 | 70 | 2 | 3 | 80 |
| 22 | 8 |  | IPA | 2 | 3 | 70 | 3 | 2 | 75 |
| 23 | 8 | tBA | IPA | 4 | 8 | 80 | 3 | 6 | 80 |
| 24 | 9 |  | MIBK | 4 | 3 | 70 | 6 | 7 | 75 |
| 25 | 9 | tBAEMA | IPA | 4 | 5 | 85 | 5 | 9 | 70 |

Chemical structure of the comonomers of table 3

| EA | Ethylacrylate | $CH_2=CH-C(O)OC_2H_5$ |
| isoBMA | Isobutylmethacrylate | $CH_2=C(CH_3)-C(O)OCH_2CH(CH_3)_2$ |
| LA | Laurylacrylate | $CH_2=CH-C(O)OC_{12}H_{25}$ |

BenzMA  Benzylmethacrylate

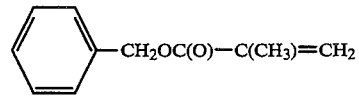

glycidylMA  Glycidylmethacrylate

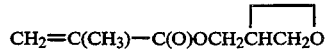

| AAEMA | AcetoacetoxyethylMA | $CH^2=C(CH3)C(O)OCH2CH2OC(O)CH2C(O)CH3$ |
| tBA | t-butylacrylate | $CH_2=CH-C(O)OC(CH_3)_3$ |

TABLE 3-continued tBAEMA t-butylaminoethylMA  $CH_2=CH-C(O)OCH_2CH_2NHC(CH_3)_3$ Solvents of table 3

IPA = Isopropylalcohol
MIBK = Methylisobuthylketone

EXAMPLE 26

Following the same method used in Example 10, a copolymer was prepared using as monomers 75 g (50% solids solution) fluorochemical monomer Ex. No. 4 and 18.7 g t-butylaminoethylmethacrylate,

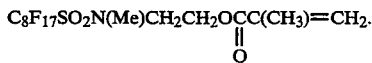

followed by 137.5 g isobutylmethylketone and 0.75 g n-octylmercaptan. After purging the reactor with nitrogen, the temperature of the reaction mixture was raised to 65° C. and 0.75 g AIBN was added. After 16 hours, the mixture was permitted to cool and gas chromatography indicated complete conversion. The resulting solution contained about 30% solids.

This solution was diluted and applied as described in Examples 12-25 and the following results were obtained:

| Polyester/cotton | OR = 2 | WR = 4 | SR = 70 |
| grain leather | OR = 3 | WR = 8 | SR = 75 |

EXAMPLES 27-30

In Examples 27, 28, 29 and 30, five different substrates other than textile and leather were treated with polymers corresponding to No. 10, 13, 20 of Table 3 as indicated in Table 4. These polymer solutions, Nos. 10, 13, 20, were diluted to 3.4% solids, in the same solvent as mentioned in Table 3, and each time 3 g of the diluted solution was sprayed onto the different surfaces of about 160 cm².

The substrates were left to dry at room temperature for 24 hours, and evaluated together with an untreated substrate, Example 30, for oil repellency (OR), water repellency (WR) and spray rating (SR).

TABLE 4

| Ex. No. | Polymer No. of Table 3 | Stone | | | Wood | | | Plastic | | | Glass | | | Metal | | |
|---|---|---|---|---|---|---|---|---|---|---|---|---|---|---|---|---|
| | | OR | WR | SR | OR | WR | SR | OR | WR | SR | OR | WR | SR | OR | WR | SR |
| 27 | 10 | 4 | 7 | 80 | 6 | 8 | 85 | 8 | 10 | 90 | 8 | 10 | 90 | 8 | 10 | 85 |
| 28 | 20 | 4 | 7 | 85 | 6 | 7 | 90 | 8 | 10 | 90 | 8 | 10 | 90 | 8 | 10 | 90 |
| 29 | 13 | 5 | 5 | 75 | 8 | 7 | 80 | 8 | 10 | 90 | 8 | 10 | 85 | 8 | 10 | 85 |
| 30 | — | 0 | 0 | 0 | 0 | 1 | 50 | 0 | 0 | 75 | 0 | 0 | 80 | 0 | 0 | 80 |

*WOOD: Mulitplex
*STONE: Red Brickstone
*PLASTIC: Polyesterfolie
*METAL: Inoxplate

EXAMPLES 31-42

In Examples 31 to 42, (0.018 g/m², 0.2 g/sqft) of 1.5% solids solution of polymer no. 13 of the invention and solutions of prior art fluorochemical compositions were sprayed onto chromium tanned grain and suede cow leather from Union Gantoise. The test results are shown in table 5, the samples were tested for OR, WR, SR and the bally water transfer test (See Scotchgard Leather Protector Manual, published by 3M Protective Chemical Products Division, January 1990).

In Examples 33-40, fluorochemical compositions which contain environmentally unacceptable solvents were used. In Examples 41 and 42, compositions were tested which use isopropanol as solvent. In Examples 31 and 32, the compositions according to the invention were tested.

As can be seen from Table 5, the compositions according to the invention show a similar performance compared to the Examples 33-40 which use environmentally unacceptable solvents. In comparison to compositions tested in Examples 41 and 42 which also use isopropanol as solvent, the performance of the compositions according to the invention is much better.

TABLE 5

| Ex. | Product | Solids | Diluted In | Leather type | OR | WR | Sr | BALLY TEST Water transfer time | absorption |
|---|---|---|---|---|---|---|---|---|---|
| 31 | no. 13 | 30% | IPA | U.G. grain | 5 | 4 | 100 | 15' | 16% |
| 32 | | | | U.G. suede | 6 | 6 | 100 | 15'30" | 16% |
| 33 | A | 3% | IPA/BuAc | U.G. grain | 3 | 7 | 90 | 12' | 13% |
| 34 | | | | U.G. suede | 5 | 6 | 80 | 12' | 20% |
| 35 | B | 25% | Hept/BuAc | U.G. grain | 5 | 7 | 100 | 9'34" | 26% |
| 36 | | | | U.G. suede | 5 | 9 | 100 | 8'49" | 29% |
| 37 | C | 40% | BuAc | U.G. grain | 1 | 1 | 50 | 9'48" | 14% |
| 38 | | | | U.G. suede | 1 | 1 | 70 | 11'45" | 28% |
| 39 | EP-A2-0100277 | 40% | BuAc | U.G. grain | 6 | 7 | 80+ | 9' | 11% |
| 40 | | | | U G. suede | 6 | 9 | 100 | 10'10" | 7% |
| 41 | U.S. Pat. No. 4,778,915 | 31% | IPA | U.G. grain | 1 | 3 | 80 | 5' | 9% |

TABLE 5-continued

| Ex. | Product | Solids | Diluted In | Leather type | OR | WR | Sr | BALLY TEST Water transfer time | absorption |
|---|---|---|---|---|---|---|---|---|---|
| 42 | | | | U.G. suede | 2 | 3 | 80 | 7' | 19% |

A = A fluorochemical urethane prepared according to U.S. Pat. No. 3,398,182 using fluorocarbon compound V, hydrocarbon compound LI and reactive compound J.
B = A fluorochemical copolymer prepared according to U S. Pat. No. 3,341,497 using 65% N-methyl perfluorooctanesulfonamidoethyl methacrylate and 35% octadecyl methacrylate.
C = A fluorochemical urethane prepared according to U.S. Pat. No. 3,398,182 using fluorocarbon compound V, 2-ethyl hexanol as the hydrocarbon compound and reactive compound J.

EXAMPLES 43–43

In Example 43, the organic polymer solution of Example 13 was converted to an aqueous dispersion by adding 200 g of the organic solution to an aqueous phase (222 g water) which contained anionic surfactant (14.4 g SERMUL EA 146) and 18 g ethylene glycol under ultra turax treatment at 65° C. This was followed by two passes through a high shear homogenizer. The resulting dispersion was stripped of the isobutylmethylketone at reduced pressure with a water aspirator and a pot. temperature of 65° C. to yield an anionic emulsion with 22% total solids.

In Example 44, the procedure described in Example 43 was used to prepare a cationic emulsion except 200 g of the polymer solution of Example 23 was substituted for the polymer of Example 13, and instead of the anionic surfactant SERMUL EA 146, cationic surfactant ETHOQUAD HT/25 (4.8 g) was used.

In Examples 43 and 44, two different rainwear fabrics were treated with the cationic and anionic aqueous emulsions of fluorochemical polymer of composition nos. 13 and 23 of Table 3, as indicated in Table 6. The fabrics were treated in a padding operation, dried at 150° C. for 5 min., and evaluated together with untreated fabrics, Example 45, for initial oil repellency (OR), water repellency (WR) and resistance to a water-spray (SR). An OR value of 3, and a SR of 70 or greater is particulary desirable for this application.

TABLE 6

| Ex. no. | Table 3 no. | Surfactant 8% on solids | % SOF | PES/COTTON OR | WR | SR | Nylon PA 66 OR | WR | SR |
|---|---|---|---|---|---|---|---|---|---|
| 43 | 13 | Sermul EA146 | 0.3 | 2 | 4 | 75 | 3 | 2 | 70 |
| 44 | 23 | Ethoq. HT/25 | 0.3 | 3+ | 3 | 75 | 3+ | 3 | 70 |
| 45 | / | / | / | 0 | 0 | 0 | 0 | 0 | 0 |

EXAMPLES 46–47

In Example 46, the anionic aqueous emulsion of composition no. 23 was evaluated for drum treatment on a chrome tanned full grain cow hide. The purpose of a drum treatment is to incorporate the fluorochemical into the protein structure of the leather. Example 47 was untreated.

TABLE 7

| Ex. | Polymer | OR | WR | SR | ABR OR | ABR WR | Bally Test Water-transfer time | Absorption % After 2 hrs. |
|---|---|---|---|---|---|---|---|---|
| 46 | 23 | 2 | 3 | 70 | 1 | 3 | >120 | 75.51 |
| 47 | untreated | 0 | 0 | 0 | 0 | 0 | 0 | 0 |

We claim:
1. Fluoroacrylate monomers obtained by the reaction of
   a) diisocyanates with a perfluoro compound or an epichlorhydrinadduct thereof, said perfluoro compound having a terminal hydroxyl, thiol, primary or secondary amino group, attached to the perfluoroalkyl group directly via an alkylene bridge or indirectly via an alkylene bridge and a sulphonamido, carbonamide, ether, thioether, sulphonyl or carboxylic ester group between the perfluoroalkyl and the alkylene group, and
   b) (meth)acrylic esters of a three hydroxyl group-containing compound.
2. Fluoroacrylate monomer of claim 1 wherein the (meth)acrylic esters are the reaction products of an equimolar reaction between (meth)acrylic acid and a three hydroxyl group containing compound.
3. Fluoroacrylate monomer according to claim 1 wherein said diisocyanates are aliphatic, alicyclic or aromatic.
4. Fluoroacrylate monomer according to claim 1 wherein the three hydroxyl groups containing compound is an alkanetriol or a triolamine.
5. Fluoroacrylate monomer according to claim 1 wherein the fluoro compounds are perfluoro alkyl substituted compounds with a terminal hydroxyl group.
6. Fluoroacrylate monomers according to claim 1 wherein the perfluoro compounds are N-alkyl(perfluorooctane)sulphoneamido alkyl alcohols or perfluoroalkyl group containing alcohols.

* * * * *

UNITED STATES PATENT AND TRADEMARK OFFICE
CERTIFICATE OF CORRECTION

PATENT NO. : 5,344,956
DATED : September 6, 1994
INVENTOR(S) : Kathy Allewaert, Dirk Coppens and Franceska Fieuws It is certified that error appears in the above-indentified patent and that said Letters Patent is hereby corrected as shown below:

TITLE PAGE

[75] Inventors: "Francecka" should be -- Franceska --

Signed and Sealed this

Fifteenth Day of November, 1994

Attest:

BRUCE LEHMAN

*Attesting Officer*   *Commissioner of Patents and Trademarks*